US012593935B2

(12) United States Patent
Van Druten et al.

(10) Patent No.: US 12,593,935 B2
(45) Date of Patent: Apr. 7, 2026

(54) SYSTEM AND METHOD FOR PREPARING A LIQUID PRODUCT

(71) Applicant: FrieslandCampina Nederland B.V., Amersfoort (NL)

(72) Inventors: Wiebe Nicolaas Van Druten, Wageningen (NL); Maarten Joannes Botman, Wageningen (NL); Willibrorda Antonia M. Van De Heijning, Wageningen (NL)

(73) Assignee: FrieslandCampina Nederland B.V., Amersfoort (NL)

( * ) Notice: Subject to any disclaimer, the term of this patent is extended or adjusted under 35 U.S.C. 154(b) by 641 days.

(21) Appl. No.: 18/086,465

(22) Filed: Dec. 21, 2022

(65) Prior Publication Data

US 2023/0148788 A1 May 18, 2023

Related U.S. Application Data

(63) Continuation of application No. PCT/NL2021/050390, filed on Jun. 22, 2021.

(30) Foreign Application Priority Data

Jun. 22, 2020 (EP) .................................... 20181420

(51) Int. Cl.
*A47J 31/52* (2006.01)
*A47J 31/40* (2006.01)
(Continued)

(52) U.S. Cl.
CPC ......... *A47J 31/5255* (2018.08); *A47J 31/402* (2013.01); *A47J 31/41* (2013.01);
(Continued)

(58) Field of Classification Search
None
See application file for complete search history.

(56) References Cited

U.S. PATENT DOCUMENTS 1,982,750 A * 12/1934 Mccue ................. B67D 1/0082
222/129.3
4,715,274 A * 12/1987 Paoletti ................. B01F 25/311
239/113
(Continued)

FOREIGN PATENT DOCUMENTS

BR 112017005409 A2 * 12/2017 .......... A47J 31/4485
CN 1214955 A 4/1999
(Continued)

OTHER PUBLICATIONS

International Search Report and Written Opinion for PCT/NL2021/050390 mailed Jul. 30, 2021. (11 pages).

*Primary Examiner* — David P Angwin
*Assistant Examiner* — Michael J. Melaragno
(74) *Attorney, Agent, or Firm* — Sunit Talapatra; Foley & Lardner LLP

(57) ABSTRACT

A system for preparing a liquid product, for example a beverage. The system comprises a product preparation assembly comprising a concentrate holder for holding product concentrate, a product feedthrough channel, and a concentrate supply channel for feeding a flow of product concentrate from said holder to said product feedthrough channel. The concentrate supply channel is provided with a valve member for regulating the flow of product concentrate, the valve member being movable with respect to the concentrate supply channel between a first position in which the flow of concentrate is blocked and a second position in which the flow of concentrate is enabled. The system comprises a product preparation apparatus configured to cooperate with the product preparation assembly. The appa- (Continued)

ratus comprises a liquid injector for supplying a flow of liquid into the product feedthrough channel, in particular via the valve member, wherein the liquid injector is configured to engage the valve member for moving the valve member. The apparatus comprises a controller configured for automatically controlling a movement of the valve member along a range of positions via actuation of the liquid injector, said range of positions extending between the first position and the second position.

20 Claims, 4 Drawing Sheets

(51) Int. Cl.

| | |
|---|---|
| *A47J 31/41* | (2006.01) |
| *A47J 31/44* | (2006.01) |
| *A47J 31/46* | (2006.01) |
| *B01F 23/231* | (2022.01) |
| *B01F 23/235* | (2022.01) |
| *B01F 25/312* | (2022.01) |
| *B01F 35/22* | (2022.01) |
| *B01F 101/14* | (2022.01) |

(52) U.S. Cl.
CPC ......... *A47J 31/4485* (2013.01); *A47J 31/461* (2018.08); *A47J 31/468* (2018.08); *B01F 23/231264* (2022.01); *B01F 23/235* (2022.01); *B01F 25/31243* (2022.01); *B01F 35/2203* (2022.01); *B01F 2101/14* (2022.01)

(56) References Cited

U.S. PATENT DOCUMENTS

| | | | | | |
|---|---|---|---|---|---|
| 4,949,631 | A | * | 8/1990 | Fregnan | A47J 31/4485 99/452 |
| 5,915,592 | A | | 6/1999 | Mehus et al. | |
| 6,682,002 | B2 | * | 1/2004 | Kyotani | F04F 5/16 239/398 |
| 8,069,778 | B2 | * | 12/2011 | Gierth | A47J 31/4485 99/452 |
| 8,939,322 | B2 | * | 1/2015 | Laible | B01F 25/31243 222/181.3 |
| 10,517,424 | B2 | * | 12/2019 | Botman | A47J 31/4485 |
| 11,542,142 | B2 | * | 1/2023 | Hayes-Pankhurst | B01F 23/236 |
| 11,649,153 | B2 | * | 5/2023 | Vermeulen | B67D 1/1252 222/52 |
| 11,690,473 | B2 | * | 7/2023 | Van Druten | A47J 31/4496 426/474 |
| 11,717,107 | B2 | * | 8/2023 | Vetterli | B67D 1/0895 222/61 |
| 11,858,797 | B2 | * | 1/2024 | Hayes-Pankhurst | B01F 25/30 |
| 12,215,013 | B2 | * | 2/2025 | Hayes-Pankhurst | B67D 1/0058 |
| 2004/0118291 | A1 | | 6/2004 | Carhuff et al. | |
| 2005/0121466 | A1 | * | 6/2005 | Sher | B67D 1/005 222/129.1 |
| 2006/0016344 | A1 | | 1/2006 | Kim et al. | |
| 2014/0042242 | A1 | * | 2/2014 | Fritze | B05B 12/1436 239/95 |
| 2016/0058239 | A1 | * | 3/2016 | Bentley | A47J 31/0631 426/433 |
| 2017/0273500 | A1 | * | 9/2017 | Botman | B01F 23/23121 |
| 2020/0163486 | A1 | * | 5/2020 | Louie | A47J 31/4489 |
| 2020/0221898 | A1 | * | 7/2020 | Van Druten | A23C 9/1524 |
| 2021/0316979 | A1 | * | 10/2021 | Hayes-Pankhurst | B01F 25/30 |
| 2023/0117409 | A1 | * | 4/2023 | Hayes-Pankhurst | B67D 1/10 222/1 |
| 2023/0148788 | A1 | * | 5/2023 | Van Druten | A47J 31/461 426/231 |
| 2024/0124290 | A1 | * | 4/2024 | Hayes-Pankhurst | B01F 25/30 |
| 2025/0243046 | A1 | * | 7/2025 | Becher | B01F 23/2361 |

FOREIGN PATENT DOCUMENTS

| | | | | | |
|---|---|---|---|---|---|
| JP | 2005-040326 | A | | 2/2005 | |
| WO | WO-2008/068597 | A2 | | 6/2008 | |
| WO | WO-2014/069993 | A1 | | 5/2014 | |
| WO | WO-2016/043590 | | | 3/2016 | |
| WO | WO-2016043590 | A1 | * | 3/2016 | A47J 31/4485 |
| WO | WO-2018/199764 | A1 | | 11/2018 | |
| WO | WO-2019/053210 | | | 3/2019 | |
| WO | WO-2023217061 | A1 | * | 11/2023 | A47J 31/4485 |
| WO | WO-2025144841 | A1 | * | 7/2025 | C08B 37/0042 |

* cited by examiner

SYSTEM AND METHOD FOR PREPARING A LIQUID PRODUCT

CROSS-REFERENCE TO RELATED APPLICATIONS

This application is a continuation of International Patent Application No. PCT/NL2021/050390 filed Jun. 22, 2021, which application claims the benefit of European Patent Application No. 20181420.9, filed on Jun. 22, 2020, both of which are incorporated herein by reference in their entireties.

FIELD OF THE INVENTION

The invention generally relates to a system and method for preparing a liquid product such as a beverage.

BACKGROUND OF THE INVENTION

Such systems and methods are generally known. As an example, WO2014/069993A1 describes a system for preparing a foamed food product, said system comprising a product preparation apparatus for preparing said foamed food product and a disposable assembly for a foamed food product.

The disposable assembly of said known system comprises: a holder containing said liquid food product in concentrated form; an eductor; a microfiltration device; a transfer tube connecting an outlet of said eductor with a product inlet of said microfiltration device; a concentrated liquid food product tube connecting said holder to a concentrated liquid food inlet of said eductor; a water inlet tube connecting a water inlet of said eductor with a water connection of the disposable assembly, said water connection being configured for connection to an external source of water under pressure, said liquid food inlet of said eductor being positioned between said water inlet and said outlet of said eductor; a gas inlet tube connecting said microfiltration device to a gas connection of said disposable assembly, said gas connection being configured for connection to an external source of gas under pressure; and a foamed food product outlet tube connecting an outlet of the microfiltration device to an outlet connection of the disposable assembly for discharging a foamed food product created by the microfiltration device from the disposable assembly.

The product preparation apparatus of said known system comprises: a water source; a heater for heating water; means for pressurizing water, said means for pressurizing water being configured for detachable connection to the water connection of the disposable assembly for supplying water to the water inlet of the eductor of the disposable assembly; a source of pressurized gas, said source of pressurized gas being configured for detachable connection to the gas connection of said disposable assembly for supplying pressurized gas to the gas inlet of the microfiltration device.

While the known system has many advantages, a need for further enhancement has arisen, in particular with respect to more precisely controlling the preparation process of the liquid product in order to provide superior product quality in under diverse operating conditions and/or for diverse product composition specifications. The diverse operating conditions are for example associated with a variable flow rate of a water supply to the disposable assembly, for example due to integration of the system with another system. The diverse product composition specifications are for example associated with user selectable specifications, for example presented as recipes, which may comprise diverse levels of firmness of a foamed dispensed food product, possibly among other variables.

WO2016/043590A1 discloses, briefly stated, an eductor suitable for use in an assembly for preparing a liquid product, characterized in that an injector valve on its outer surface comprises two annular protrusions which are spaced from each other by a distance that at least equals a distance between a first position and a second position of the injector valve, each of the annular protrusions engaging an inner surface of a cylindrical wall for forming a seal therewith, said annular protrusions together with the inner surface of the cylindrical wall forming an annular chamber, said protrusions being arranged for isolating the annular chamber from fluid communication with any environment outside the annular protrusions.

DESCRIPTION OF THE INVENTION

An object of the invention is to at least partially fulfil the above described need or an associated need, in particular while maintaining advantages of the exemplary known system. An object is to provide an improved system and method for preparing a liquid product, wherein in particular control of the product preparation process is improved, in particular under a range potentially varying conditions and/or product specifications. An object is to provide such a system and method which provide improved product quality and/or product hygiene compared to a known system or method, wherein in particular one or more product quality parameters can be controlled to conform to a user preference, i.e. a user adjustable or tailored product quality.

To that end, an aspect of the present disclosure provides a system for preparing a liquid product, for example a beverage. The system comprises a product preparation assembly which comprises a concentrate holder for holding product concentrate, a product feedthrough channel, and a concentrate supply channel for feeding a flow of product concentrate from said holder to said product feedthrough channel. The concentrate supply channel is provided with a valve member for regulating the flow of product concentrate, the valve member being movable with respect to the concentrate supply channel between a first position in which the flow of concentrate is blocked and a second position in which the flow of concentrate is enabled.

The system comprises a product preparation apparatus configured to cooperate with the product preparation assembly. The apparatus comprises a liquid injector for supplying a flow of liquid into the product feedthrough channel, in particular via the valve member, wherein the liquid injector is configured to engage the valve member for moving the valve member. The apparatus comprises a controller configured for automatically controlling a movement of the valve member along a range of positions via actuation of the liquid injector, for example during the supplying of the flow of liquid, said range of positions extending between the first position and the second position.

Controlling said movement may comprise adjusting a position of the valve member along the range of positions, in particular subsequently positioning the valve member at different positions along the range of positions, for example subsequently at the first position, at an intermediate position between the first and second position, and at the second position, and/or vice versa.

Such a controller enables improved control of properties of the dispensed product, wherein in particular a ratio between the flow of product concentrate and the flow of liquid can be well controlled, for example such that said ratio is less or not dependent on a potentially variable flow rate of the flow of liquid. Such a variable flow rate can be related to a variable supply of gas (e.g. air) which can be supplied for foaming the product, e.g. gas supplied by a gas injector as explained elsewhere in this disclosure. Also, such properties, for example said ratio, can thus be varied during the product dispensing process, for example if so desired in view of a user preference regarding the dispensed product. In this way, for example a beverage can be dispensed wherein a foamed product firmness varies gradually within the beverage, in particular varying along an axial and/or radial dimension of a beverage which is dispensed in a substantially cylindrical receptacle such as a cup or a mug.

The product preparation apparatus may comprise a gas injector separate from the liquid injector for supplying a flow of gas to the product preparation assembly, wherein the product preparation assembly is configured to mix the flow of gas with a flow of product, in particular in a mixing section of the product preparation assembly downstream of the product feedthrough channel. Preferably the mixing section comprises a microfiltration device which includes gas transmissive pores through which during use the flow of gas is fed into the flow of product.

A foamed liquid product, for example a foamed beverage, can thus be dispensed, in particular with good quality and good product hygiene.

The product preparation apparatus may comprise a measurement unit for measuring at least one property of at least one flow, for example the flow of product concentrate, the flow of liquid, the flow of gas and/or a flow of product. Preferably the controller is operatively connected to the measurement unit for receiving an input associated with the at least one property measured by the measurement unit, wherein the controller is configured for controlling the movement of the valve member at least partly dependent on the at least one property. It should be noted that the said measuring unit and said controller can be integrated components, and/or can be implemented by a single controller-measuring unit, for example via suitable hardware, software, and/or microelectronics et cetera as will be appreciated by the skilled person.

According to an embodiment said controller is configured to function as a director. For example, the controller can be configured to adjust control a set of functions. In particular, according to an embodiment, the controller (director) can set a water flow, and it can direct a heater to achieve a set temperature. Next the controller (director) can open a valve and in the course of preparing a product (e.g. a drink) may adjust both the valve (milk concentrate ratio), gas/air ratio, and/or even a water flow rate (with adjusted heater settings).

Control of product properties can thus be improved, in particular when the at least one property of the at least one flow is substantially variable, wherein for example the controller can act to limit said variability from adversely affecting the product properties.

The liquid injector may be provided with a positioning assembly for controllably changing a position of the liquid injector with respect to the product preparation assembly, in particular with respect to the concentrate supply channel. Said positioning assembly comprises a positioning actuator, for example a motor, which is at least selectively engaged with the liquid injector, and preferably a positioning sensor, in particular an encoder, for sensing a position and/or a position change of the positioning actuator and/or of the liquid injector.

Preferably the positioning assembly comprises a set of mutually engaged gears which provide a transmission between the positioning actuator and the liquid injector, the set of gears including a driving gear connected to the positioning actuator and a driven gear connected to the liquid injector.

Good, e.g. precise and/or fast, control of valve member movement can thus be provided.

The controller may be selectively operable in one of at least two different modes, in particular user selectable modes, wherein each of said modes comprises at least one respective rule for controlling the movement of the valve member, in particular controlling said movement depending on a measurement.

The product dispensing process can thus be easily adjusted depending on a user preference.

The product preparation apparatus may be configured to gradually change a speed of motion of the valve member along the range of positions.

One or more dispensed product properties can thus be varied relatively smoothly over the course of dispensing, resulting in a superior product dispensing result.

The product preparation apparatus may be configured to stably position the valve member subsequently in at least three different positions along the range of positions.

The three different positions may include the first position and the second position, wherein the three different positions can further include at least one intermediate position which is between the first position and the second position. The product preparation apparatus may thus be configured to maintain the valve member in at least one intermediate position which is between the first position and the second position, in particular while supplying the flow of liquid.

A relatively diverse set of concentrate flow rates can thus be selectively provided, thus providing a versatile system which enables good control of dispensed product properties.

The product preparation assembly and the product preparation apparatus may be configured for together forming an eductor pump for at least selectively pumping product concentrate from the holder through the concentrate supply channel to the product feedthrough channel, the eductor pump being driven by the flow of liquid during use.

Such an eductor pump in a product preparation system is known as such, e.g. from WO2014/069993A1, and can advantageously be incorporated in a product preparation system according to the present disclosure.

The product preparation apparatus may comprise a heater for heating the flow of liquid, in particular heating prior to supplying the flow of liquid to the product feedthrough channel of the product preparation assembly.

Such a heater can provide good control of a temperature of the dispensed product. A heated flow of liquid can also provide further improved product properties, such as improved foaming of a dispensed product.

It is preferred that the heater is controlled by the above-mentioned controller, in particular for setting and/or adjusting water heating provided by the heater during operation. Preferably, according to an embodiment, the heater is controlled such that the apparatus is acting just below a water boiling temperature (pressurized system). It is preferred that the heater is controlled such that boiling of water is prevented during operation, in particular in case a foamed product is to be dispensed.

A further aspect of the present disclosure provides a product preparation apparatus evidently configured to cooperate with a product preparation assembly, in particular to form a system as described above for preparing a liquid product. Said product preparation apparatus comprises a liquid injector for supplying a flow of liquid to a product feedthrough channel of the product preparation assembly, wherein the liquid injector is configured to engage a valve member of the product preparation assembly for controllably moving the valve member. Said product preparation apparatus comprises a controller configured for automatically controlling the movement of the valve member along a range of positions via actuation of the liquid injector.

Such a product preparation apparatus can provide above-mentioned advantages.

A further aspect of the present disclosure provides method of preparing a liquid product. The method comprises: providing a system as described above for preparing a liquid product; engaging the valve member by the liquid injector; supplying the flow of liquid into the product feedthrough channel, in particular via the valve member; and controllably moving the valve member, for example automatically, along the range of positions via actuation of the liquid injector, for example prior to, during and/or after the supplying.

Such a method can provide above-mentioned advantages.

The method may further comprise obtaining a measurement of a property, for example a flow rate, of a flow, in particular a flow from the product preparation apparatus to the product preparation assembly, for example a flow of liquid and/or a flow of gas, wherein controllably moving the valve member is dependent, at least partly dependent, on the obtained measurement.

Controllably moving the valve member may comprise gradually changing a speed of motion of the valve member along the range of positions.

Controllably moving the valve member may comprise stably positioning, e.g. maintaining, the valve member subsequently in at least three different positions along the range of positions, the three different positions for example including the first position, the second position and an intermediate position which is between said first and second positions.

The method may comprise supplying a flow of gas to the product preparation assembly, in particular separate from the flow of liquid.

The method may comprise heating the flow of liquid, in particular prior to the supplying.

In the following the invention will be explained further using exemplary embodiments and drawings. The drawings are schematic and merely show examples. In the drawings, similar or corresponding elements have been provided with similar or corresponding reference signs.

Figure 4:
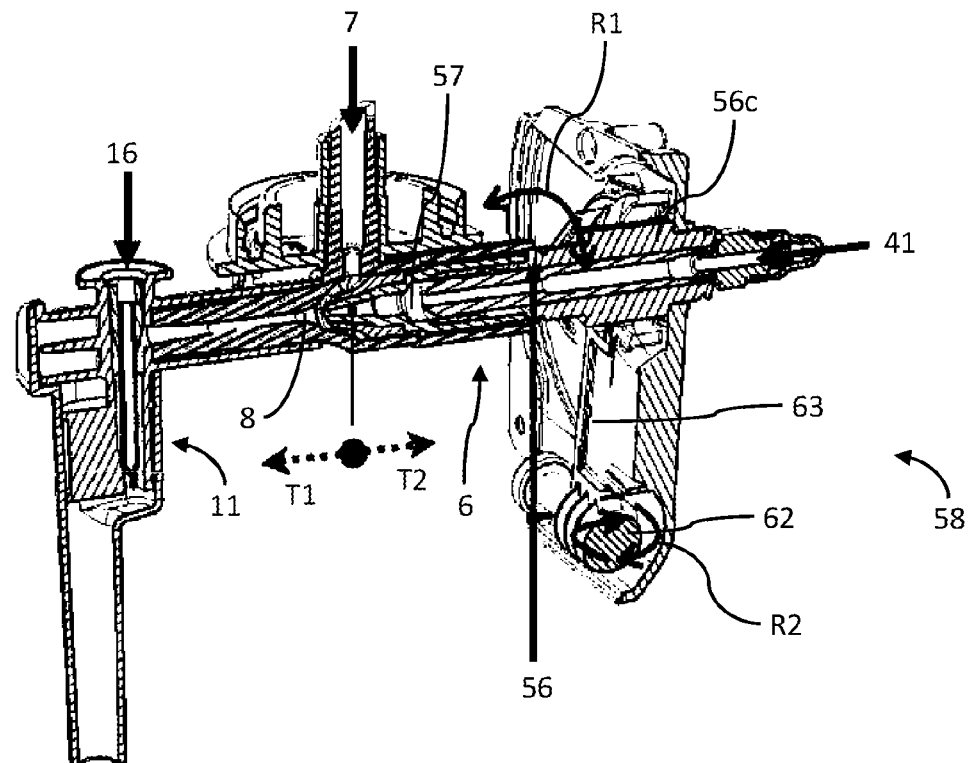
FIG. 4 shows a partial perspective cross section view of the parts of the system of FIG. 3.
Figures 5A, 5B, 5C:
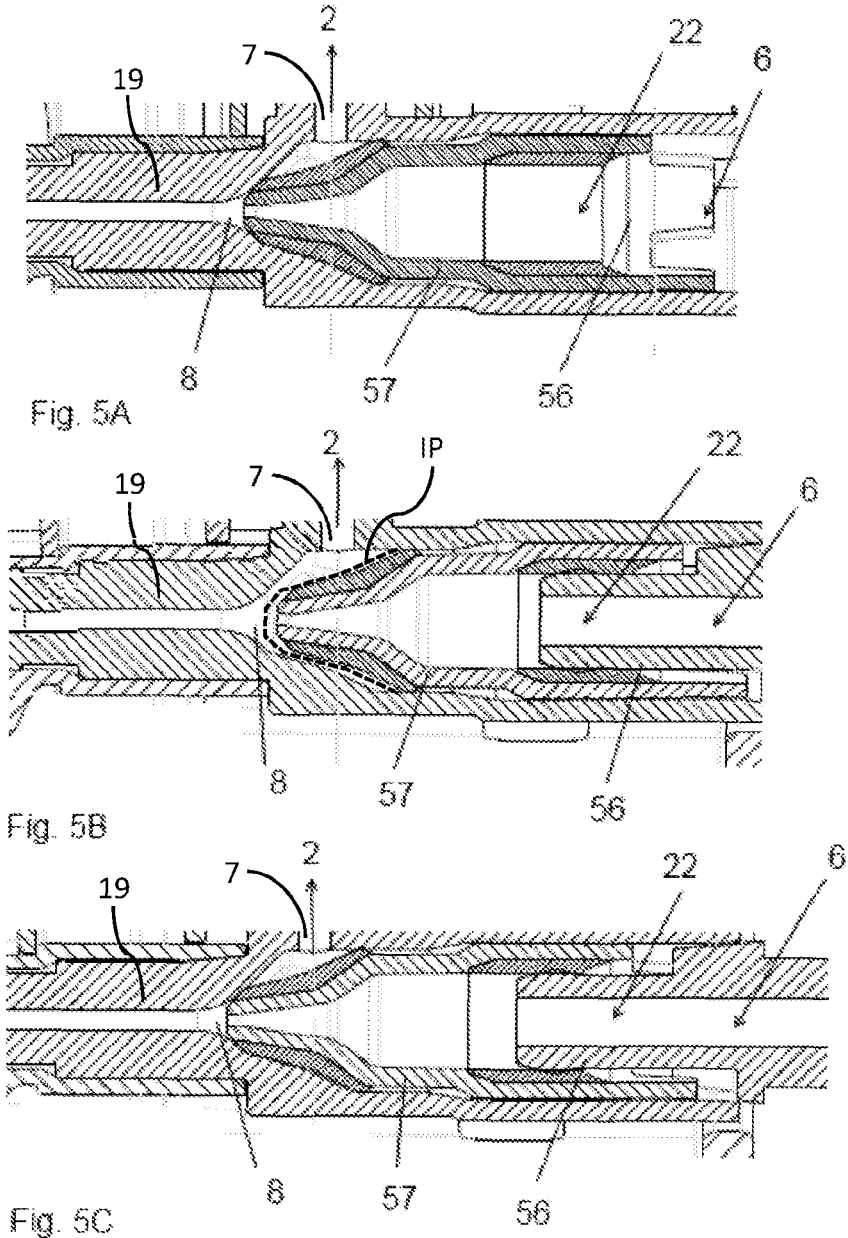

FIG. 5A shows detail Q of FIG. 4, showing an injector valve of the system in disabling position, disabling connection of a water inlet of an eductor with a water connection of the disposable product preparation assembly; and FIGS. 5B and 5C both show the injector valve in enabling position, enabling connection of the water inlet of said eductor with the water connection of the disposable product preparation assembly, the injector valve in FIG. 5B being in an enabling position enabling connection of the holder to the liquid food product outlet of said eductor, and the injector valve in FIG. 5C being in a disabling position disabling connection of the holder to the liquid food product outlet of said eductor.

In the following, first general aspects of the exemplary system S will be described, which aspects substantially correspond to the disclosure of WO2014/069993A1. Thereafter, said exemplary system S will be described in terms of features of the present invention as described in the introduction, which features may partly overlap with the general aspects.

Figure 1:
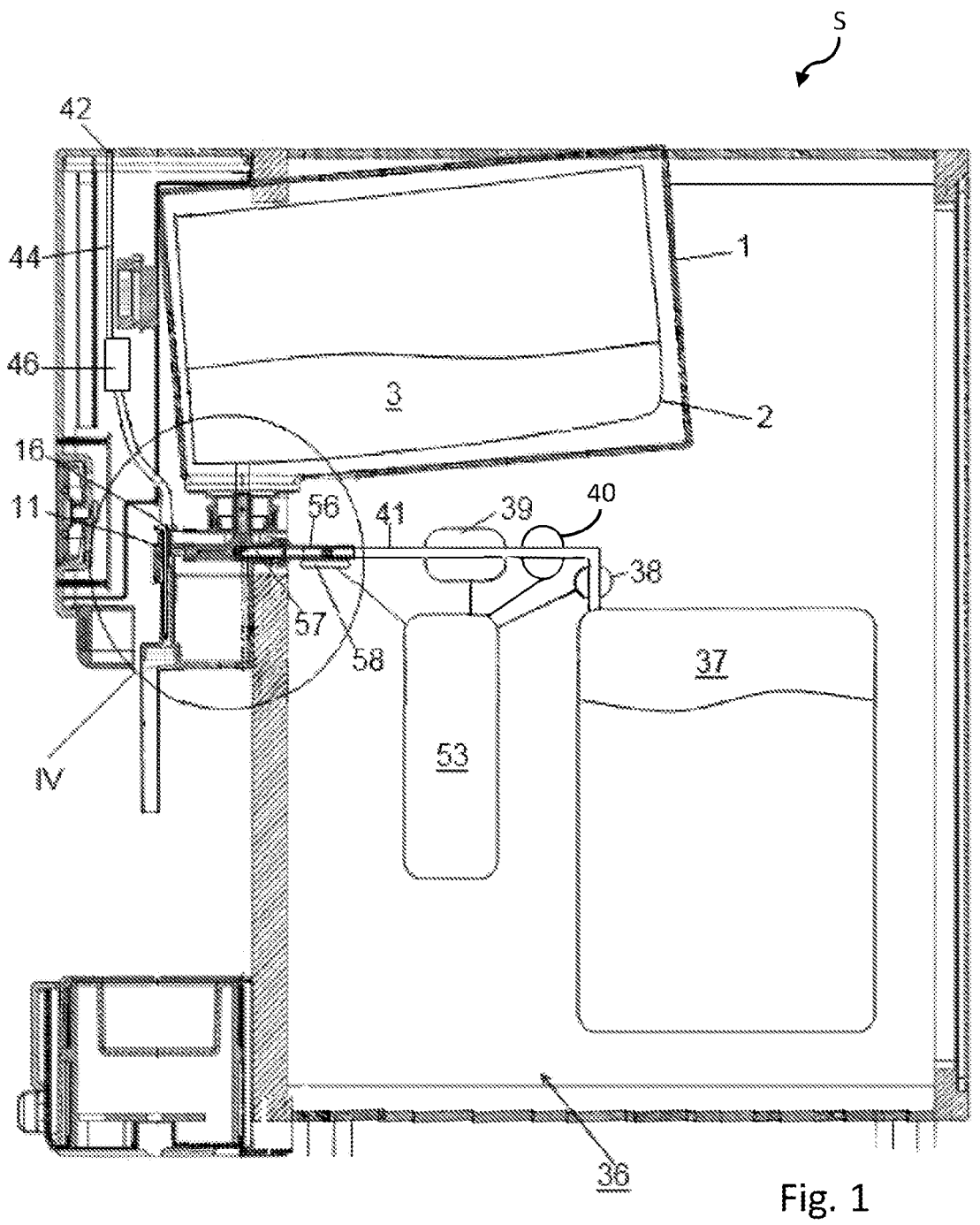
FIG. 1 shows a schematic view in cross section of an embodiment of a system for preparing a foamed food product.
Figure 2:
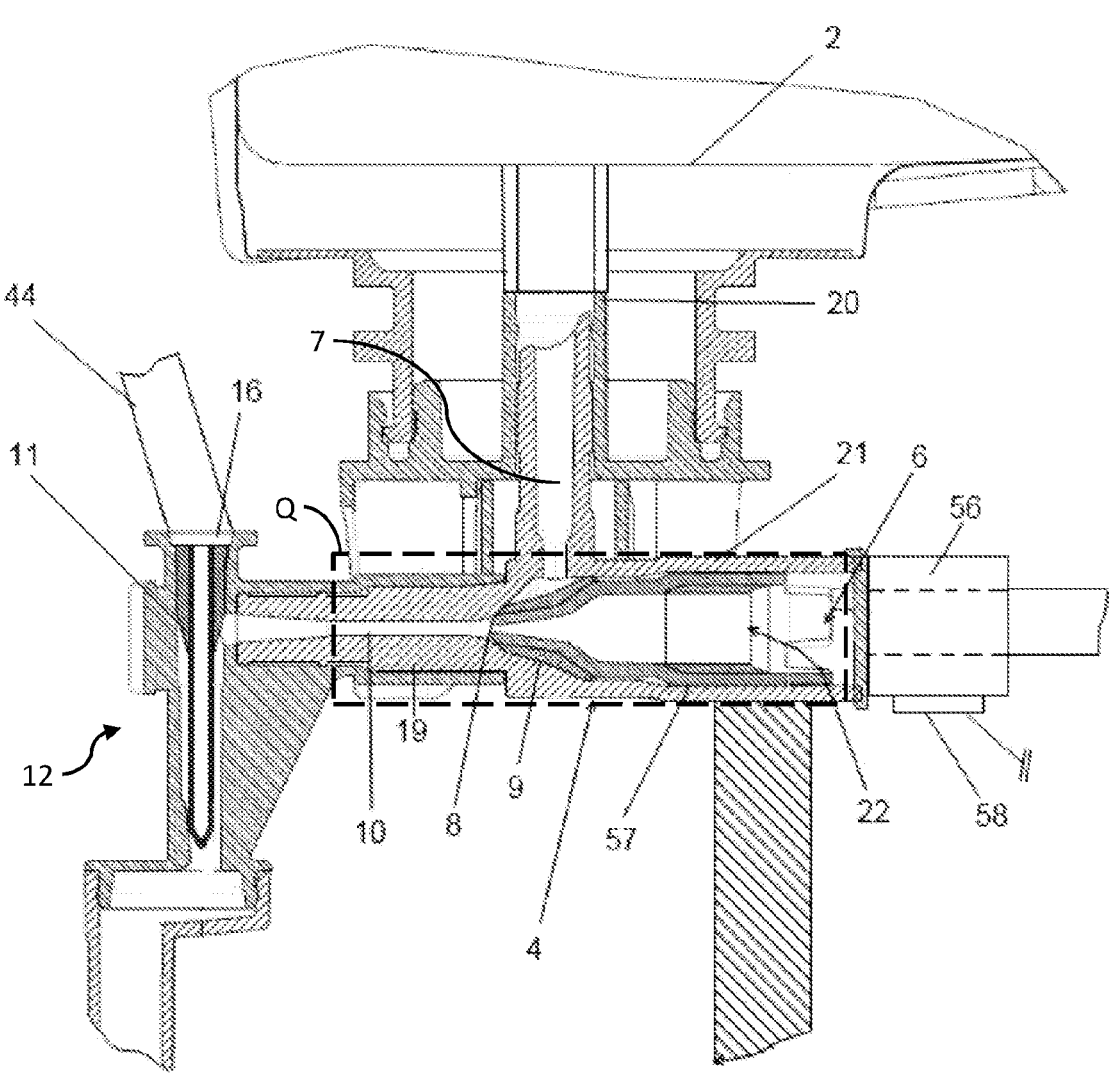
FIG. 2 shows detail IV of FIG. 1 on an enlarged scale.

In FIGS. 1 and 2 an embodiment of a system for preparing a liquid product, in this example a foamed food product, according to the invention is schematically shown in cross section, in which the product preparation apparatus 36 comprises an injector valve actuator 56, and in which the disposable assembly 1 comprises an injector valve 57.

The disposable assembly 1 comprises a holder 2 which in this example is designed to contain a maximum amount of 4 liters of milk 3 in concentrated form. This milk-based concentrate 3 comprises 20 wt % dry matter to 30 wt % dry matter, preferably 23-27 wt % dry matter, whereas milk with a normal water content, which latter is also called unconcentrated milk herein, comprises 10 wt % dry matter. In addition, the maximum amount of milk based concentrate 3 contained in the holder 2 can in other embodiments of the invention amount to 2 to 5 liters for professional use and 0.3 to 1 liter for home use and the milk based concentrate can in other embodiments comprise 20 wt % dry matter to 30 wt % dry matter, preferably 23-27 wt % dry matter.

The disposable assembly 1 furthermore comprises an eductor 4, a water inlet 6, a concentrated liquid food inlet 7 and a liquid food product outlet 8. A converging nozzle 9 is present which is in direct communication with the water inlet 6 and a mixing chamber and a low-pressure zone (e.g. formed by a diffuser or venture) 10 which are in direct communication with the liquid food product outlet 8 of the eductor 4.

The disposable assembly 1 is in addition provided with a microfiltration device 11 with an air opening 16.

In the disposable assembly 1 a transfer duct 19 connects the outlet 8 of the eductor 4 with the product inlet opening of the microfiltration device 11. Furthermore, a concentrated liquid food product duct 20 connects the holder 2 to the concentrated liquid food inlet 7 of the eductor 4 and a water inlet tube 21 connects the water inlet 6 of the eductor 4 with a water connection 22 of the disposable assembly 1. This water connection 22 is configured for connection to an external source of water 37 via a water line 41.

The air opening 16 of the disposable assembly 1 is configured for connection to an external source of air via an air line 44 in which an air compressor 46 is incorporated.

In the product preparation apparatus 36 a water reservoir 37 is provided as well as a pump 38 as a means for pressurizing water. From the water reservoir 37 the water line 41 runs through the product preparation apparatus 36 and is configured for detachable connection to the water connection 22 of the disposable assembly 1 for supplying water to the water inlet 6 of the eductor 4 of the disposable assembly 1.

In the product preparation apparatus 36 also a source of air 42, in this case an opening in the product preparation apparatus 36 to the ambient atmosphere, is provided in which the opening is closed off by a grid for preventing larger particles passing the opening. From the source of air 42 the air line 44 runs through the product preparation apparatus 36 and is configured for detachable connection to the air inlet or opening 16 of the disposable assembly 1 for supplying air to the air inlet 16 of the microfiltration device 11 of the disposable assembly 1.

The product preparation apparatus 36 further comprises an operating device 53, e.g. microelectronics, hardware, software and/or a microprocessor or the-like, for controlling the operation of the product preparation apparatus 36. For this, the operating device 53 can be connected to the relevant devices or components of the apparatus 36 via suitable wired and/or wireless control signal communication lines as will be clear to the skilled person. It will be appreciated that the controlling by the operating device 53 preferably comprises active, dynamic controlling, sometimes also called directing, as opposed to a more passive or static type of controlling which is e.g. substantially limited to a single fixed set point. Thus the operating device 53 is preferably configured to act as a director for actively directing the operation of the product preparation apparatus 36, in particular dynamic operation of various parts thereof in a carefully coordinated manner with respect to each other.

The injector valve actuator 56 is part of the means for pressurizing water of the product preparation apparatus 36 and is arranged for—after connection of the disposable assembly 1 to the product preparation apparatus 36—engaging the injector valve 57, i.e. when the means for pressurizing water are connected to the water connection of the disposable assembly. The injector valve actuator 56 is operatively connected via a driver 58 and lines to the operating device 53, and the injector valve actuator 56 is in this embodiment rotatable under control of the operating device 53.

The injector valve actuator 56 is—after connection of the disposable assembly to the product preparation apparatus—in engagement with the injector valve 57 and is operable under control of the operating device 53 for positioning the injector valve 57 for example in an enabling position for enabling connection of the water inlet 6 of the eductor 4 with the concentrated milk connection of the disposable assembly 1 (as shown in FIG. 5B), or for example in a disabling position (as shown in FIGS. 5A and 5C) for disabling connection of the water inlet of said eductor with the concentrated milk connection of the disposable assembly.

In the embodiment shown in FIGS. 1 and 2 the injector valve 57 is a rotatable injector valve and is in addition configured such, e.g. by providing suitably positioned openings, as to also enable connection of the holder 2 to the liquid food product outlet 8 of the eductor 4 when the injector valve 57 is enabling connection of the water inlet 6 of the eductor 4 with the water connection 22 of the disposable assembly 1 (as shown in FIG. 5B) and for disabling connection of the holder 2 to the liquid food product outlet 8 of the eductor 4 (as shown in FIG. 5C) when the injector valve 57 is enabling connection of the water inlet 6 of the eductor 4 with the water connection 22 of the disposable assembly 1, respectively. In the position as indicated in FIG. 5C it is possible to perform flushing without concentrated liquid food product being entrained out of the holder. As indicated in the FIGS. 1, 2 and 5A-C the injector valve 57 is also configured to be converging.

During an exemplary operation of the exemplary system for preparing a foamed food product, the operating device 53 first controls the operation of the heater 39 for heating water and the means for pressurizing water, in particular the pump 38, such that the water can be heated up to a desired temperature (e.g. a temperature just below boiling temperature). In order to determine water temperature, the operating device 53 can e.g. be connected to and/or be provided or associated with a water temperature sensor (not depicted) that can be located at or near the heater, or downstream of the heater, for measuring the temperature of the heated water.

A predetermined time period after the operating device 53 has activated the heater 39 and the pump 38 the operating device 53 activates the injector valve actuator 56 into rotation so that the injector valve 57, which is biased in the disabling position, is rotated to the enabling position by engagement with the injector valve actuator 56. Then the heated water, which has already been pressurized, is passed to the eductor 4 and by enabling the connection to the holder 2, concentrated liquid food product 3 is entrained out of the holder 2. Thereafter a foaming process takes place wherein air is introduced into the mix of the concentrated liquid food product 3 and the heated water, in particular introduced through gas transmissive pores of the microfiltration device 11.

After a serving of the foamed food product, i.e. in this case milk froth, has been dispensed, the operating device 53 controls the injector valve actuator 56 for rotating the injector valve 57 in the disabling position first, and a predetermined time period thereafter, e.g. a time period of between 2 to 10 seconds, deactivates the heater 39 and the pump 38, and optionally the air compressor 46. The operating device 53 may alternatively deactivate the heater 39 at a certain time point prior to rotating the injector valve 57 in the disabling position, in particular to enable excess/remaining heat from the heater 39 to be dissipated.

The invention can prepare hot pourable foams, for instance, cappuccino, latte macchiato and other hot milk drinks, with or without flavor additions. In a further elaboration, to that end, the product is foamed to a minimum overrun of 10% and obtains/has immediately after dispensing a temperature between 50 and 85° C., preferably between 60 and 70° C. and most preferably between 65 and 68° C. The product may be, for instance, predominantly pourable (for instance, with an overrun lower than 100%).

Alternatively, the invention can prepare cold and ice-cold drinks, for instance, milk drink, milk shake, lunch drink, etc. In that case, the product can have, for instance, a minimum overrun of 10% and a temperature lower than 20° C., preferably a temperature between −5 and 10° C. The cold, dispensed product may be predominantly pourable and can e.g. comprise a sweet or, conversely, a salty product, a fermented milk product.

The invention is particularly well-suited to prepare ice cream or a (milk) shake. The ice cream or (milk) shake product can have an overrun in the range of 10%-200% and a temperature of 0° C. or lower (preferably a temperature in the range of −10° C. to −2° C.).

The invention can be used, for instance, such that a product mentioned undergoes an overrun that is greater than 100% (in particular 150% or more, and more particularly 200% or more), utilizing a relatively low pressure (in particular a pressure of air supplied to the air supply space mentioned), for instance, a pressure lower than 0.2 MPa. The invention can be used, for instance, such that a product mentioned undergoes an overrun that is greater than 100% (in particular 150% or more, and more particularly 200% or more), while the dispensed product has a relatively low temperature, for instance, a temperature of 0° C. or lower.

In the following, the exemplary system S will be further described in terms of features of the present invention as described in the introduction, which features may partly overlap with general aspects of said system as described above. Compared to the above description of the general aspects, different terms may be used for the same element in the below description, as will be clear from the associated reference signs and the drawings which are to be interpreted as jointly relating to both parts of the description. Thus both parts of the description are to be regarded as mutually complimentary, wherein the above described general aspects can be regarded as possible elaborations of an embodiment of the invention.

The drawings show at least a part of an exemplary system S for preparing a liquid product, for example a beverage. See FIG. 1 for a schematic overall view of the system S. The system S comprises a product preparation assembly 1 comprising a concentrate holder 2 for holding product concentrate 3, a product feedthrough channel 19, and a concentrate supply channel 20 for feeding a flow of product concentrate 3 from said holder 2 to said product feedthrough channel 19. The concentrate supply channel 20 is provided with a valve member 57 for regulating the flow of product concentrate, the valve member 57 being movable with respect to the concentrate supply channel 20 between a first position in which the flow of concentrate is blocked, as shown for example in FIGS. 2, 5A and 5C, and a second position in which the flow of concentrate is enabled, as shown for example in FIG. 5B.

The system S comprises a product preparation apparatus 36 configured to cooperate with the product preparation assembly 1. The apparatus 36 comprises a liquid injector 56 for supplying a flow of liquid into the product feedthrough channel 19, in particular via the valve member 57, wherein the liquid injector 56 is configured to engage the valve member 57 for moving the valve member 57. The apparatus comprises a controller 53, 58 configured for automatically controlling a movement of the valve member 57 along a range of positions via actuation of the liquid injector 56, said range of positions extending between the first position and the second position.

As will be explained further, controlling said movement may comprise adjusting the position of the valve member 57 along the range of positions, in particular subsequently positioning the valve member 57 at different positions along the range of positions, for example subsequently at the first position, at an intermediate position between the first and second position, and at the second position, and/or vice versa.

Figure 3:
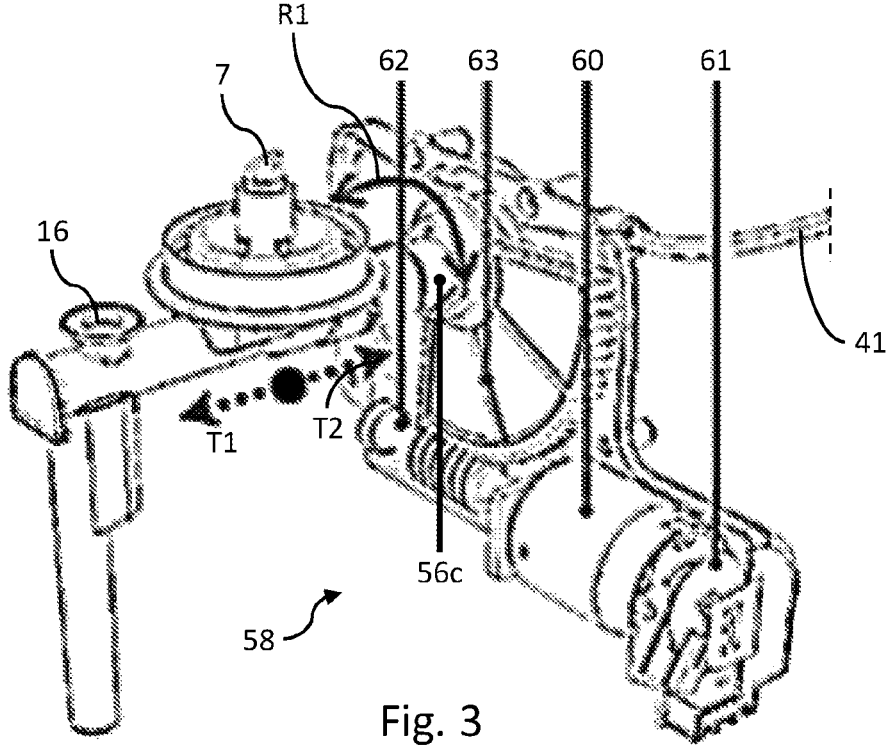
FIG. 3 shows a partial perspective view of an exemplary system for preparing a liquid product according to an embodiment, including part of a disposable product preparation assembly and a cooperating part of a product preparation apparatus.

In the example, the controller 53, 58 comprises (part of) the operating device 53 and the driver 58, wherein during use the operating device 53 operates the driver 58, in particular through control of a motor 60 of the driver 58. FIGS. 3 and 4 show details of the driver 58. It will be appreciated that FIGS. 1 and 2 show the driver 58 only highly schematically and that in practice the driver may be realized and arranged in various ways as will be clear from relevant parts of the present description and for example from FIGS. 3 and 4.

In the example, the product preparation apparatus 36 comprises a gas injector 42, 44, 46 separate from the liquid injector 56 for supplying a flow of gas to the product preparation assembly 1. The product preparation assembly 1 is configured to mix the flow of gas with a flow of product, in particular in a mixing section 12 of the product preparation assembly downstream of the product feedthrough channel 19, wherein preferably the mixing section 12 comprises a microfiltration device 11 which includes gas transmissive pores through which during use the flow of gas is fed into the flow of product.

In the example, the product preparation apparatus 36 comprises a measurement unit 40 for measuring at least one property of at least one flow, for example the flow of product concentrate, the flow of liquid, the flow of gas and/or a flow of product. The controller 53, 58 is operatively connected to the measurement unit 40 for receiving an input associated with the at least one property measured by the measurement unit 40, wherein the controller 53, 58 is configured for controlling the movement of the valve member 57 at least partly dependent on the at least one property.

During use, in response to a measured reduced flow rate in the flow of liquid, the controller 53, 58 may thus for example act to reduce the flow of concentrate by accordingly moving the valve member 57 to restrict the flow of concentrate, thereby maintaining a ratio of said flows within a desired, e.g. predetermined, range. As another example, the controller 53, 58 may thus move the valve member 57 in an opposite direction, reducing said restriction, in response to a measured increased flow rate in the flow of liquid. As yet another example, in response to said flow rate of the flow of liquid being measured as substantially constant, the controller 53, 58 may act to move the valve member to deliberately vary said ratio of flows as desired, e.g. according to a user selected recipe.

Preferably, said ratio of flows can thus be adjusted between a plurality of different non-zero ratios, e.g. predefined ratios, wherein the controller 53, 58 can act to maintain such a predefined ratio e.g. over a predefined amount of time. Alternatively, or additionally, the controller 53, 58 can controllably vary said ratio, e.g. by a predefined amount over a predefined amount of time. Such maintaining and/or varying preferably involves maintaining and/or adjusting a position of the valve member 57 along the range of positions ranging from the first to the second position, for example in dependence of information stored in a memory of the operating device 53 and/or received information such as measurement information. Such stored information may for example comprise one or more predefined valve member positions and/or speeds, calibration information and/or controlling rules. Said ration of flows can for example thus be adjusted while the flow of liquid is being supplied and/or while product is thus being prepared.

In the example, the liquid injector 56 is provided with a positioning assembly 58 for controllably changing a position of the liquid injector 56 with respect to the product preparation assembly 1, in particular with respect to the concentrate supply channel 20. The positioning assembly 58 comprises a positioning actuator 60, for example a motor 60, which is at least selectively engaged with the liquid injector 56, and preferably a positioning sensor 61, in particular an encoder 61, for sensing a position and/or a position change of the positioning actuator 60 and/or of the liquid injector 56. Preferably the positioning assembly 58 comprises a set of mutually engaged gears 62, 63 which provide a transmission between the positioning actuator 60 and the liquid injector 56, the set of gears 62, 63 including a driving gear 62 connected to the positioning actuator 60 and a driven gear 63 connected to the liquid injector 56.

In the example, the controller 53, 58 is selectively operable in one of at least two different modes, in particular user selectable modes, wherein each of said modes comprises at least one respective rule for controlling the movement of the valve member 57, in particular controlling said movement depending on a measurement. Such a rule can comprise for example a relationship to be controlled between respective flows of the liquid and the product concentrate, as described above with respect to the measurement unit. Thus, such a rule can follow from a user selected option, e.g. recipe, for the product dispensing.

In the example, the product preparation apparatus 36 is configured to gradually change a speed of motion of the valve member 57 along the range of positions.

In the example, the product preparation apparatus 36 is configured to stably position the valve member 57 subsequently in at least three different positions along the range of positions.

Here the three different positions include the first position (see FIGS. 5A, 5C) and the second position (see FIG. 5B), wherein the three different positions further includes at least one intermediate position which is between the first position and the second position. One such intermediate position IP has been indicated in FIG. 5B with a dashed line representing a partial outline of the valve member 57. Here it can be seen that in this intermediate position IP, compared to the second position, the valve member 57 constricts the flow path between the inlet 7 and the outlet 8, however without completely blocking said flow path, thus different from the first position.

The exemplary product preparation apparatus 36 is thus configured to maintain the valve member 57 in at least one intermediate position IP which is between the first position and the second position, in particular while supplying the flow of liquid. It will be appreciated that while FIG. 5B indicates one such an intermediate position IP, a range of intermediate positions can thus be defined between the first position and the second position, wherein the constriction of said flow path generally varies along the range of positions. Thus good flow control of product concentrate is provided by controlling movement of the valve member 57 along the range of positions, wherein controlling said movement for example includes maintaining, e.g. stably positioning, the valve member 57 in at least one intermediate position between the first and second position. Controlling said movement for example includes gradually moving the valve member 57 between different positions along the range of positions, for example at one or more predetermined speeds, for example with a relatively small acceleration.

In the example, the product preparation assembly 1 and the product preparation apparatus 36 are configured for together forming an eductor pump 4 for at least selectively pumping product concentrate from the holder 2 through the concentrate supply channel 20 to the product feedthrough channel 19, the eductor pump 4 being driven by the flow of liquid during use.

In the example, the product preparation apparatus 36 comprises a heater 39 for heating the flow of liquid, in particular heating prior to supplying the flow of liquid to the product feedthrough channel 19 of the product preparation assembly 1.

The exemplary system S is thus shown as comprising a product preparation apparatus 36 evidently configured to cooperate with a product preparation assembly 1 to form the system S, the apparatus 36 comprising a liquid injector 56 for supplying a flow of liquid to a product feedthrough channel 19 of the product preparation assembly 1, wherein the liquid injector 56 is configured to engage a valve member 57 of the product preparation assembly 1 for controllably moving the valve member 57, wherein the product preparation apparatus 36 comprises a controller 53, 58 configured for automatically controlling the movement of the valve member 57 along a range of positions via actuation of the liquid injector 56.

With reference to the drawings and the above description of the exemplary system S, an exemplary method of preparing a liquid product comprises: providing the system S for preparing a liquid product; engaging the valve member 57 by the liquid injector 56; supplying the flow of liquid into the product feedthrough channel 19, in particular via the valve member 57; and controllably moving the valve member 57, for example automatically, along the range of positions via actuation of the liquid injector 56, for example prior to, during and/or after the supplying.

The exemplary method further comprises: obtaining a measurement of a property, for example a flow rate, of a flow, in particular a flow from the product preparation apparatus 36 to the product preparation assembly 1, for example a flow of liquid and/or a flow of gas, wherein controllably moving the valve member 57 is dependent on the obtained measurement.

In the example, controllably moving the valve member 57 comprises gradually changing a speed of motion of the valve member 57 along the range of positions.

In the example, controllably moving the valve member 57 comprises stably positioning the valve member 57 subsequently in at least three different positions along the range of positions.

The exemplary method further comprises: supplying a flow of gas to the product preparation assembly 1, in particular separate from the flow of liquid; and heating the flow of liquid, in particular prior to the supplying.

While the invention has been described with reference to exemplary embodiments and drawings, it will be appreciated that these do not limit the scope of the invention, which scope is provided by the claims. Many variations, combinations and extensions are possible, as will be appreciated by the skilled person. For example the system may or may not be configured for dispensing a foamed product, the valve member may or may not be rotatable, the controller may or may not comprise a gear, and control of the valve member may or may not be dependent on a flow measurement.

In this application, gas that is used for foaming the product can e.g. a gas mixture, for example air, as follows from the above.

The invention claimed is:

1. A system for preparing a liquid product, comprising:

(a) a product preparation assembly, comprising:

(i) a concentrate holder for holding product concentrate, (ii) a product feedthrough channel, and (iii) a concentrate supply channel for feeding a flow of product concentrate from the holder to the product feedthrough channel, wherein the concentrate supply channel is provided with a valve member for regulating the flow of product concentrate, the valve member being movable with respect to the concentrate supply channel between a first position in which the flow of concentrate is blocked and a second position in which the flow of concentrate is enabled; and (b) a product preparation apparatus configured to cooperate with the product preparation assembly, the apparatus comprising a liquid injector for supplying a flow of liquid into the product feedthrough channel, optionally via the valve member, wherein the liquid injector is configured to engage the valve member for moving the valve member, and (c) a controller configured for automatically controlling a movement of the valve member along a range of positions via actuation of the liquid injector, the range of positions extending between the first position and the second position, wherein controlling the movement of the valve member comprises positioning the valve member at an intermediate position between the first position and the second position.

2. The system according to claim 1, wherein the product preparation apparatus comprises:

(a) a gas injector separate from the liquid injector for supplying a flow of gas to the product preparation assembly, wherein the product preparation assembly is configured to mix the flow of gas with a flow of product, wherein the mixing section optionally comprises a microfiltration device which includes gas transmissive pores through which during use the flow of gas is fed into the flow of product.

3. The system according to claim 1, wherein the product preparation apparatus comprises:

(a) a measurement unit for measuring at least one property of at least one flow, wherein the controller is operatively connected to the measurement unit for receiving an input associated with the at least one property measured by the measurement unit, and wherein the controller is configured for controlling the movement of the valve member at least partly dependent on the at least one property.

4. The system according to claim 3, wherein the property of at least one flow is the flow of product concentrate, the flow of liquid, the flow of gas and/or a flow of product.

5. The system according to claim 1, wherein the liquid injector is provided with a positioning assembly for controllably changing a position of the liquid injector with respect to the product preparation assembly, wherein the positioning assembly comprises a positioning actuator, which is at least selectively engaged with the liquid injector, and optionally a positioning sensor, for sensing a position and/or a position change of the positioning actuator and/or of the liquid injector.

6. The system according to claim 5, wherein the positioning sensor is an encoder.

7. The system according to claim 6, wherein the positioning assembly comprises a set of mutually engaged gears which provide a transmission between the positioning actuator and the liquid injector, the set of gears including a driving gear connected to the positioning actuator and a driven gear connected to the liquid injector.

8. The system according to claim 1, wherein the controller is selectively operable in one of at least two different modes, wherein each of the modes comprises at least one respective rule for controlling the movement of the valve member.

9. The system according to claim 8, wherein the controlling the movement depends on a measurement.

10. The system according to claim 1, wherein the product preparation apparatus is configured to gradually change a speed of motion of the valve member along the range of positions.

11. The system according to claim 1, wherein the product preparation apparatus is configured to stably position the valve member subsequently in at least three different positions along the range of positions.

12. The system according to claim 1, wherein the product preparation assembly and the product preparation apparatus are configured for together forming an eductor pump for at least selectively pumping product concentrate from the holder through the concentrate supply channel to the product feedthrough channel, the eductor pump being driven by the flow of liquid during use.

13. The system according to claim 1, wherein the product preparation apparatus comprises a heater for heating the flow of liquid.

14. The system according to claim 1, wherein the heating is prior to supplying the flow of liquid to the product feedthrough channel of the product preparation assembly.

15. A product preparation apparatus configured to cooperate with a product preparation assembly to form a system according to claim 1, the apparatus comprising the liquid injector for supplying the flow of liquid to the product feedthrough channel of the product preparation assembly, wherein the liquid injector is configured to engage a valve member of the product preparation assembly for controllably moving the valve member.

16. A method of preparing a liquid product, comprising:

(a) providing a system for preparing a liquid product according to claim 1;

(b) engaging the valve member by the liquid injector;

(c) supplying the flow of liquid into the product feedthrough channel; and (d) controllably moving the valve member along the range of positions via actuation of the liquid injector, wherein the moving of the valve member comprises positioning the valve member at an intermediate position between the first position and the second position.

17. The method according to claim 16, further comprising:

(e) obtaining a measurement of a property, wherein controllably moving the valve member is dependent on the obtained measurement.

18. The method according to claim 16, wherein controllably moving the valve member comprises gradually changing a speed of motion of the valve member along the range of positions.

19. The method according to claim 16, wherein controllably moving the valve member comprises stably positioning the valve member subsequently in at least three different positions along the range of positions.

20. The method according to claim 16, further comprising at least one of:

(i) supplying a flow of gas to the product preparation assembly; and (ii) heating the flow of liquid.

* * * * *